(12) United States Patent
Grieves et al.

(10) Patent No.: US 8,769,169 B2
(45) Date of Patent: Jul. 1, 2014

(54) ASSISTIVE BUFFER USAGE TECHNIQUES

(75) Inventors: Jason A. Grieves, Redmond, WA (US); Nicholas H. Wrem, Seattle, WA (US); Paul J. Reid, Woodinville, WA (US); Brett D. Humphrey, Seattle, WA (US); Douglas R. Kirschner, Seattle, WA (US); Niranjan Shivanand Baligar, Redmond, WA (US); Andres E. Espinoza-Masias, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 193 days.

(21) Appl. No.: 13/225,206

(22) Filed: Sep. 2, 2011

(65) Prior Publication Data

US 2013/0060975 A1 Mar. 7, 2013

(51) Int. Cl.
*G06F 3/00* (2006.01)
(52) U.S. Cl.
USPC .......................................................... 710/52
(58) Field of Classification Search
None
See application file for complete search history.

(56) References Cited

U.S. PATENT DOCUMENTS

| 5,899,975 | A | | 5/1999 | Nielsen | |
|---|---|---|---|---|---|
| 6,104,414 | A | * | 8/2000 | Odryna et al. | 345/536 |
| 7,669,149 | B2 | | 2/2010 | Dietl et al. | |
| 7,818,671 | B2 | | 10/2010 | De Souza | |
| 2002/0161462 | A1 | * | 10/2002 | Fay et al. | 700/94 |
| 2007/0211071 | A1 | | 9/2007 | Slotznick et al. | |
| 2010/0070872 | A1 | | 3/2010 | Trujillo | |
| 2010/0134416 | A1 | | 6/2010 | Karasin et al. | |
| 2010/0262908 | A1 | | 10/2010 | Gallo et al. | |
| 2012/0047176 | A1 | * | 2/2012 | Timmons | 707/780 |

OTHER PUBLICATIONS

Reisberg, Leon., "Inexpensive Assistive Technology for Struggling Readers", Retrieved at <<http://www.ltschools.org/files/www/file/special-ed/Inexpensive%20Assistive%20Technology%20for%20Struggling%20Readers.pdf>>, Retrieved Date: Aug. 10, 2011, pp. 6.

* cited by examiner

*Primary Examiner* — Idriss N Alrobaye
*Assistant Examiner* — David Martinez
(74) *Attorney, Agent, or Firm* — Tony Azure; Andrew Sanders; Micky Minhas (57) ABSTRACT

Assistive buffer usage techniques are described. In one or more implementations, audio generated through text-to-speech conversion is output, the audio corresponding to text portioned in one of a plurality of buffers from an item of content. An input is received to rewind or fast forward the output of the audio. Responsive to the input, additional audio is output that was generated through text-to-speech conversion from text portioned in another one of the plurality of buffers.

20 Claims, 7 Drawing Sheets

ASSISTIVE BUFFER USAGE TECHNIQUES

BACKGROUND

Assistive techniques have been developed as the name implies to help users interact with computing devices. One example of an assistive technique is text-to-speech conversion. In text-to-speech conversion, text included in content is converted to audio such that a user may hear what is included in content that is displayed by the computing device.

However, while conventional assistive techniques were well suited for reading traditional documents, such as a word process document or text of a book, these techniques are often ill suited for the different varieties of content with which a user may now interact, such as content that includes embedded controls.

SUMMARY

Assistive buffer usage techniques are described. In one or more implementations, audio generated through text-to-speech conversion is output, the audio corresponding to text portioned in one of a plurality of buffers from an item of content. An input is received to rewind or fast forward the output of the audio. Responsive to the input, additional audio is output that was generated through text-to-speech conversion from text portioned in another one of the plurality of buffers.

In one or more implementations, content is received that is to be displayed by a computing device in a specified arrangement. The content is portioned into a plurality of buffers and the buffers having the portioned content are exposed for navigation through the content using one or more assistive techniques during display of the content in the specified arrangement.

In one or more implementations, one or more computer-readable storage media include computer executable instructions that, responsive to execution by a computing device, cause the computing device to implement an assistive technology to perform text-to-speech conversion of a web page, the assistive technology employing a plurality of buffers to navigate through the webpage, each said buffer assigned a portion of the web page such that controls embedded in the webpage are assigned respective buffers separately from text of the webpage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

A variety of different assistive techniques have been made available to user to interact with computers, such as a read to perform a text-to-speech conversion. However, conventional assistive techniques may become cumbersome when confronted with content having embedded controls, such as webpages.

Accordingly, assistive buffer usage techniques are described which may be utilized to support assistive techniques such as text-to-speech conversion. For example, a webpage may be obtained via a network for display by a computing device. The webpage may be portioned into a plurality of buffers to aid navigation through the webpage. Controls included in the webpage, for instance, may be portioned into individual buffers separate from other text of the webpage.

Inputs may then be supported to navigate between the buffers, thereby enabling a user to fast forward or rewind through an audio output of the content. In this way, a user may readily locate a portion of the content of interest, whether text to be read or controls to be initiated. These techniques may also support a variety of additional functionality, such as to leverage heuristics, access different functionality during a pause of an output of the content, include a description of a control, and so on as further described in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
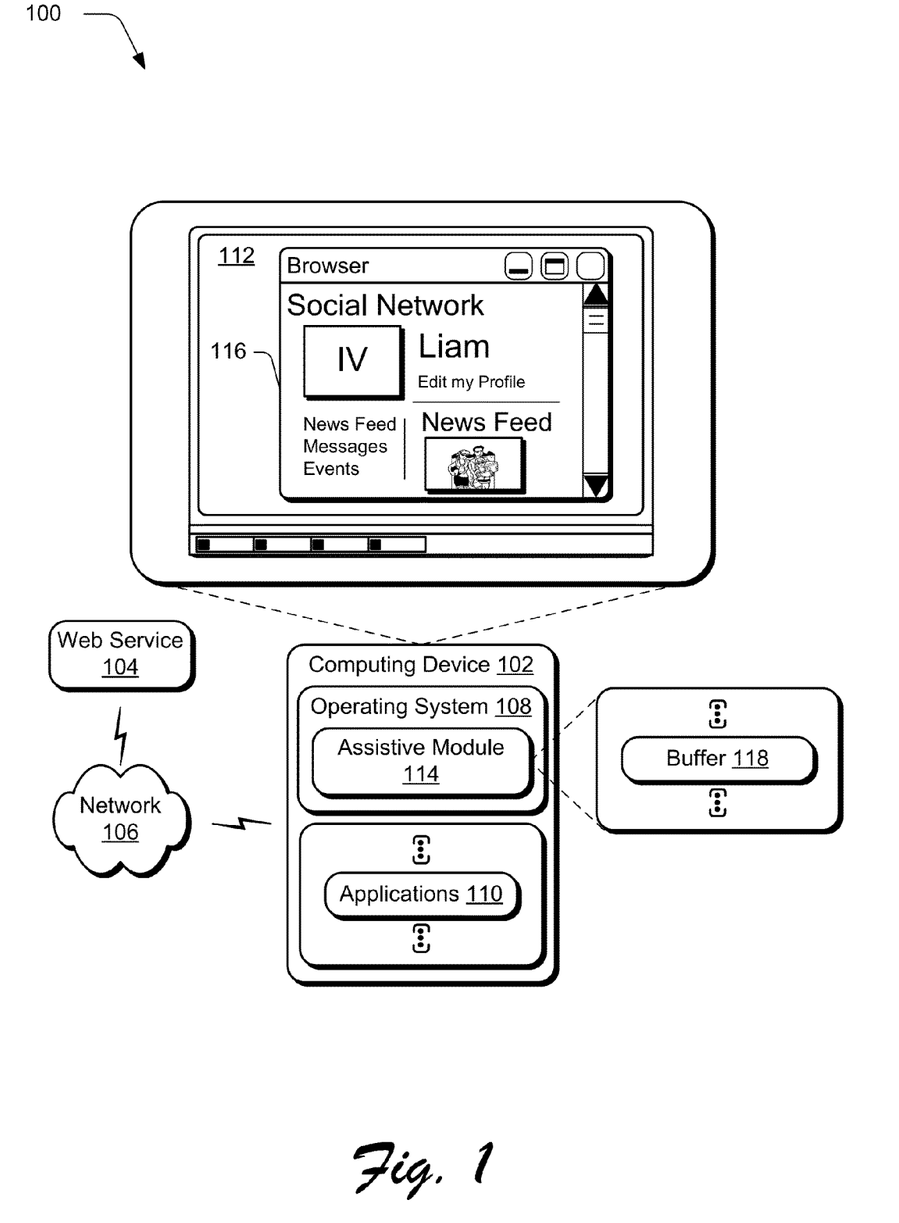
FIG. 1 is an illustration of an environment in an example implementation that is operable to perform assistive buffer usage techniques.

FIG. 1 is an illustration of an environment 100 in an example implementation that is operable to employ accessibility techniques that leverage buffers as described herein. The illustrated environment 100 includes a computing device 102 that is communicatively coupled to a web service 104 via a network 106, e.g., to receive a webpage. The computing device 102 as well as computing devices that may implement the web service 104 may be configured in a variety of ways.

For example, a computing device may be configured as a computer that is capable of communicating over the network 106, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by the web service 104, a remote control and set-top box combination, an image capture device and a game console configured to capture gestures, and so on.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The computing device 102 is further illustrated as including an operating system 108. The operating system 108 is configured to abstract underlying functionality of the computing device 102 to applications 110 that are executable on the computing device 102. For example, the operating system 108 may abstract processing, memory, network, and/or display functionality of the computing device 102 such that the applications 110 may be written without knowing "how" this underlying functionality is implemented. The application 110, for instance, may provide data to the operating system 108 to be rendered and displayed by the display device 112 without understanding how this rendering will be performed.

The operating system 108 may also represent a variety of other functionality, such as to manage a file system and user interface that is navigable by a user of the computing device 102. An example of this is illustrated as an output of a window 116 of a browser that is displayed on the display device 112 of the computing device 102.

The operating system 108 is also illustrated as including an assistive module 114. The assistive module 114 is representative of functionality of the computing device 102 to employ one or more assistive techniques. For example, the assistive module 114 may employ text-to-speech conversion to "read" text to provide an audio output to a user of the computing device 102.

The assistive module 114 may utilize programmatic access techniques to expose elements displayed in a user interface such as text and controls which may include buttons, checkboxes, radio buttons, text-entry portions, links, and so on. Thus, a wide variety of content may be read by the assistive module 114. One example of such content includes webpages received from the web service 104 via the network 106. Additional examples include user interfaces output through execution of the applications 110, such as a media player, documents, spread sheets, and any other user interface that includes a display of text or other items.

Conventional screen reading experiences typically operated one of two ways, exclusively. One such technique relied on keyboard shortcuts to enable users to read through the text on the screen with text commands and therefore could consume an entire document, line by line, paragraph by paragraph, and so on. Although this instance worked well for text-centric user interfaces (e.g., a text document), it was inefficient when applied to content having embedded controls, such as webpages that contain a significant amount of chrome and controls.

In another example, keyboard shortcuts were utilized to enable users to navigate through user interface elements in a logical fashion. For example, an application may include a "pane" with 4 buttons inside of it. A conventional screen reader would allow the user to move from the buttons to the pane with commands to move "up" since the pane contains the buttons inside of it. Although this model could address complex apps and webpages, it relied on the user to build a mental model of the logical structure of the user interface.

Further, these conventional techniques relied on a user to choose which mode to use. However, the user may not know which mode is best to use and neither model may be well suited for the current content. Additionally, as applications became more complex, it might not be apparent as to which conventional mode was to be used by the user. One example of this involves webpages that include a multitude of controls that may be arranged in groups as well as embedded in the content. Consequently, these webpages may have increased complexity that is not addressed by the conventional techniques. This difficulty may be exacerbated on touchscreen devices that do not include keyboards, which may cause users to have access to a limited set of gestures that correspond to keyboard shortcuts but do not have access to each of the keyboard shortcuts.

In one or more implementations, the assistive module 114 may employ a "flattened" view of a user interface that provides a blending of text and controls (e.g., UI elements) to assist a user in navigating through the content. For example, this flattening may be performed to arrive at a combination of content and controls in which complex controls are broken down and read in a logical fashion. Additionally, the blending may be performed to combine (e.g., using heuristics) to determine which content and controls have an increased likelihood of being of interest to a user. In addition, this flattened view may employ a "fast forward/rewind" command to enable a user to hear the content and controls that are relevant but avoid controls that are irrelevant, e.g., by using heuristics. Additionally, the assistive module 114 may support pause functionality to enable a user to navigate discretely with text commands, UI element navigation commands, and/or the "fast forward/rewind" commands described above.

To achieve this flattened view, the assistive module 114 may employ a plurality of buffers, an example of which is illustrated as buffer 118 which may be representative of one or more buffers. Accordingly, in the following discussion buffer 118 may be referenced in singular or plural form. The buffers 118 may be used to portion content such that the assistive module 114 may enable navigation between the buffers. This portioning may be utilized to support the functionality described above for the "flattened view" of the content. An example of portioning of content may be found beginning in relation to FIG. 2.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
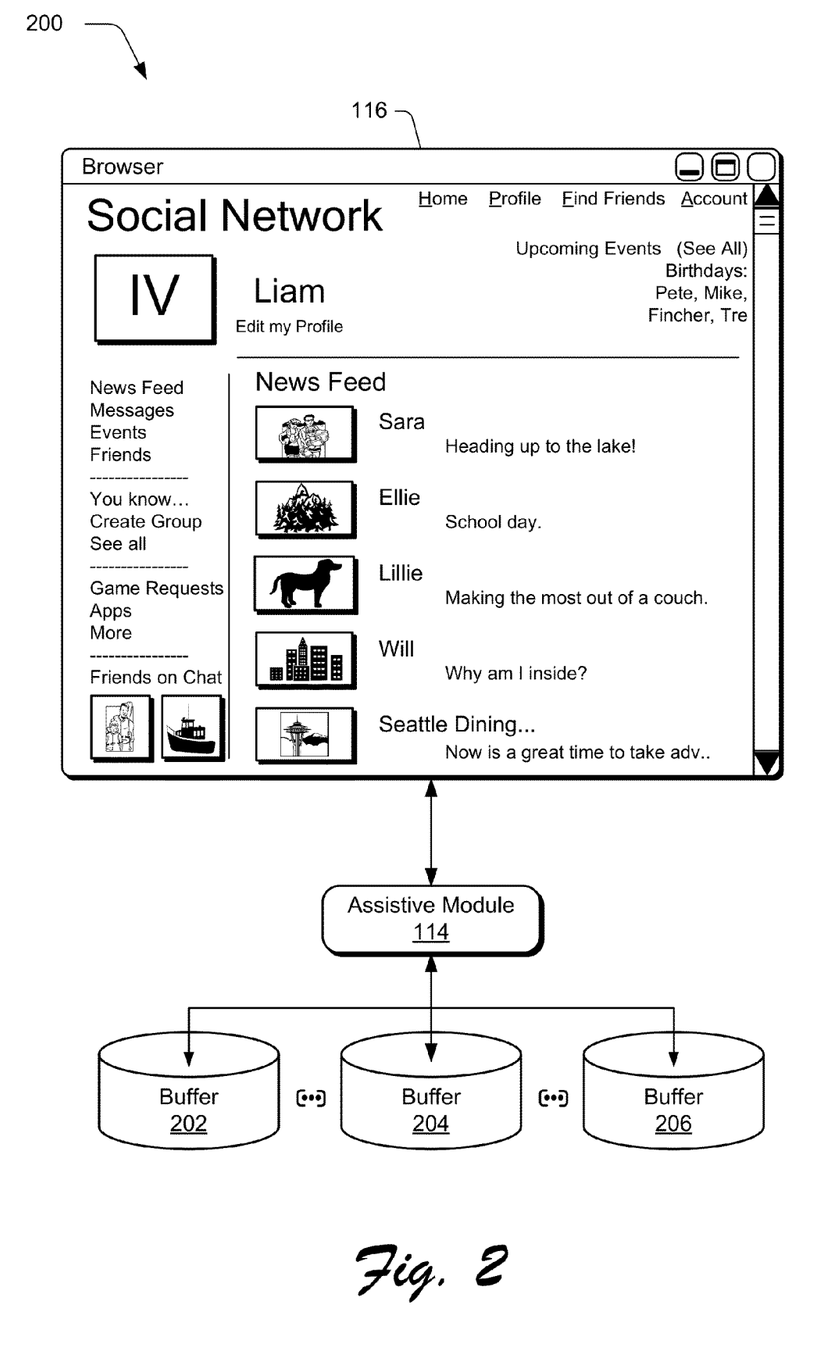
FIG. 2 is an illustration of a system in an example implementation showing portioning of a webpage by an assistive module of FIG. 1 into a plurality of buffers.

FIG. 2 is an illustration of a system 200 in an example implementation showing portioning of a webpage by an assistive module of FIG. 1 into a plurality of buffers. A window 116 of a browser is shown in greater detail in FIG. 2 as outputting a webpage from a social network. As illustrated, a top of the webpage 116 includes a name and a variety of controls. The left-side of the webpage 116 also includes a variety of controls, and newsfeed information is displayed below and to the right of these controls.

In conventional assistive techniques, a screen reader would either allow a user to either read the web page with text commands or move through the application with UI element navigation commands. For text commands, for instance, a user may say "read the entire page" and the user would hear "Social Network, Home, Profile, Find Friends, Account, Upcoming Events (See All), Birthdays: Pete, Mike, Fincher, Tre, News Feed, News Feed, Messages, Events, Sara, Heading up to the lake!, Friends, You know . . . , Ellie, School Day, Create Group," and so on. Thus, in this conventional mode, although the user may get the "gist" of the webpage, the user may miss information about the structure and the controls and even the difference between what is a control and what is text included in the webpage. For conventional UI element navigation commands, the user may access listings of controls. However, the user is again left without a good idea of a layout of the content and may involve a significant amount of time to locate a portion of the content that may be of interest to the user.

In one or more implementations described herein, however, the assistive module 114 may employ a model to leverage buffers, which may be used to assist in identification and navigation of portions of content displayed by the display device 112. For example, the assistive module 114 may review and portion content into a plurality of buffers, examples of which as illustrated as buffers 202, 2024, 206. A user may then provide inputs to navigate through the buffers 202, 204, 206 to locate portions of content that may be of interest to the user.

The assistive module 114, for instance, may employ pre-defined thresholds and criteria to portion the content, which may be based on heuristics. For example, if there are more than ten words on a current line in the content, then the buffers may be populated in ten word increments. If there are less than ten words on the line, then a single buffer may be populated with the words in that line.

When a control is encountered (e.g., a UI element such as a button, check box, link, and so on), a single buffer may be used to store the control. In one or more implementations an exception is made for controls in UI automation that contain text, a DataGrid, edit with Value "isReadOnly" set as "true", a group, a header, pane, scrollbar, separator, or text. In this implementation, other controls are populated in single buffers, respectively. Naturally, other examples are also contemplated, e.g., where this exception is not made.

The assistive module 114 may then be employed to read through and navigate between the buffers 202, 204, 206. For example, if a control is included in a current buffer being read, the assistive module 114 may read a control type (e.g., in UI automation techniques) followed by a text range that is included with that element. If text is not included then the assistive module 114 may skip reading the content of that buffer. Thus, these techniques may be used to assist a user in navigating through the content as well as locating content of interest.

For example, repeating a portion of the above example using these techniques the assistive module 114 may output the following audio which each commas denote different buffers, "News Feed hyperlink, News Feed header, Messages hyperlink, Events hyperlink, Sara, Heading up to the lake!, Friends hyperlink, You know . . . group hyperlink, Ellie, School Day" and so on. Thus, a user may readily determine a control and control type, differentiate between controls and text, as well as determine a general layout of the content.

Additionally, the assistive module 114 may support commands to navigate between the buffers. For example, a "rewind" command may be supported to navigate to a previous buffer and output content of that buffer, e.g., read text included in the buffer. Likewise, a "fast forward" command may be supported to navigate to the next buffer and output content of that buffer, e.g., read text included in the buffer. Additional commands may also be supported to navigate to a next or previous buffer that contains a control. In this way, a user may listen to a portion of a buffer and if that buffer does not contain content of interest, the user may cause the assistive module 114 to navigate to another buffer and begin output of content and thus "skip" at least a portion of an output of the content.

The assistive module 114 may also make a variety of functionality available during a pause in an output of the content. For example, a user may provide an input to pause reading of the content from a buffer, a user may switch from this mode that leverages use of the buffers to another mode that does not leverage buffers, such as the models described above.

Additionally, if a user pauses output of a buffer and then wishes to resume output from that buffer, reading of the content of the buffer may start again at a beginning of the buffer, although other implementations are also contemplated. In an instance in which a user causes the computing device 102 to leave a current item of content and then return to that item, the assistive module 114 may "remember where it was" and continue output from a last buffer that was output for that content. Thus, the assistive module 114 may provide a variety of functionality to navigate and output content, further discussion of which may be found in relation to the following procedures.

Example Procedures

The following discussion describes assistive buffer usage techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
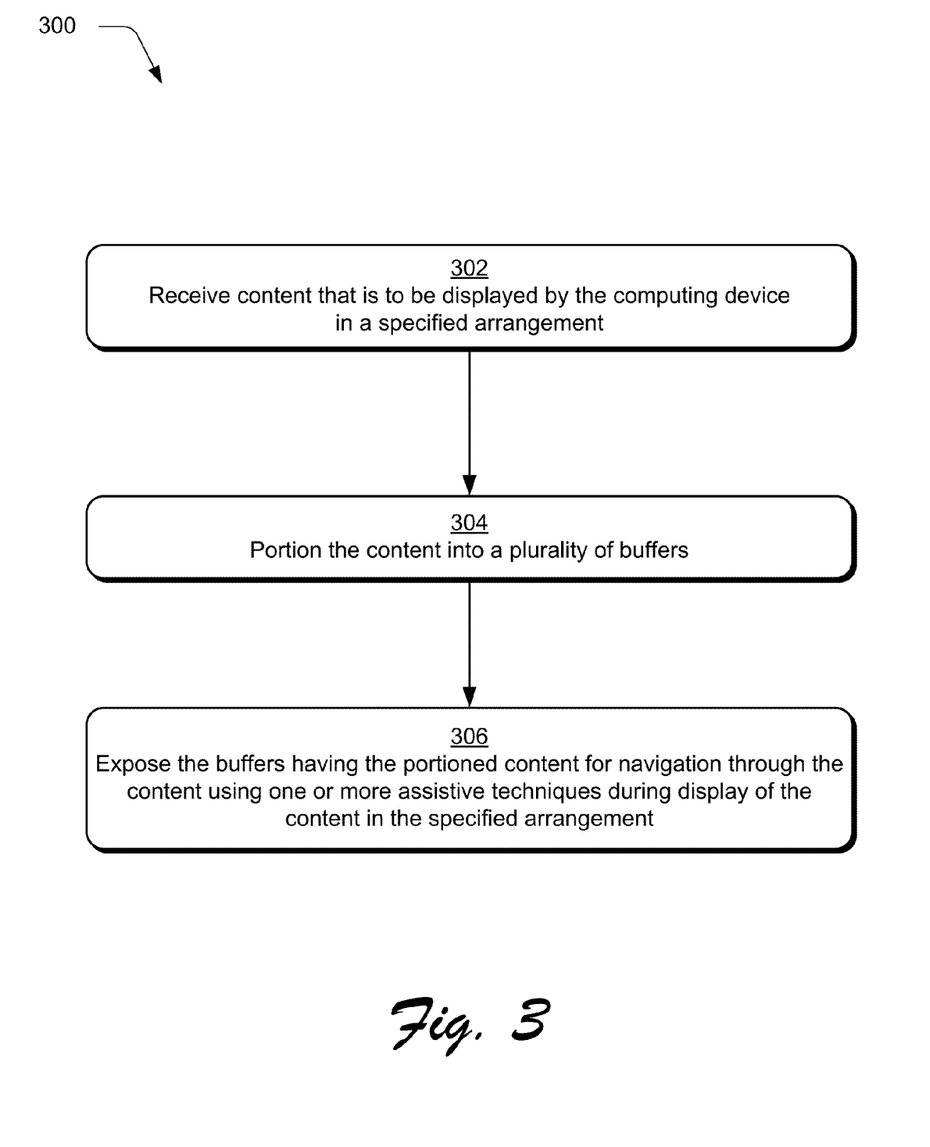
FIG. 3 is a flow diagram depicting a procedure in an example implementation in which content is portioned into a plurality of buffers and exposed for use in navigation using an assistive technique.

FIG. 3 depicts a procedure 300 in an example implementation in which content is portioned into a plurality of buffers and exposed for use in navigation using an assistive technique. Content is received that is to be displayed by the computing device in a specified arrangement (block 302). As previously described, the assistive module 114 may support a wide variety of content, such as webpages, documents, spreadsheets, music files, and other data. Further, this functionality may be incorporated by the computing device 102 in a variety of ways, such as part of an operating system 108, part of applications 110 that are executed by the computing device 102 (e.g., a browser), as a stand-alone module, a plug-in module, and so on.

The content is portioned into a plurality of buffers (block 304). For example, the assistive module 114 may utilize a variety of heuristics to determine how to portion the content. The heuristics may be used to differentiate text from controls, identify a type of control that may then be output with a description of the control, and so on. Additionally, the heuristics may be used to determine which parts of the content are not to be included in the buffers, such as layout elements including separators, header elements, and so on. Naturally, other implementations are also contemplated in which these items, although not included in the buffers explicitly, may be used in description of other elements. For example, the layout elements may be used to determine an order in which the buffers are to be read, form logical groupings of buffers, and so on.

The buffers having the portioned content for navigation through the content using one or more assistive techniques during display of the content in the specified arrangement (block 306). The assistive module 114, for instance, may perform the portioning dynamically such that a predetermined number of buffers to include content located around a current selection point are formed. In another instance, the assistive module 114 may portion an entirety of the content as it is received. The assistive module 114 may then leverage the buffers to navigate and output the portions of the content, an example of which is described in relation to the following figure.

Figure 4:
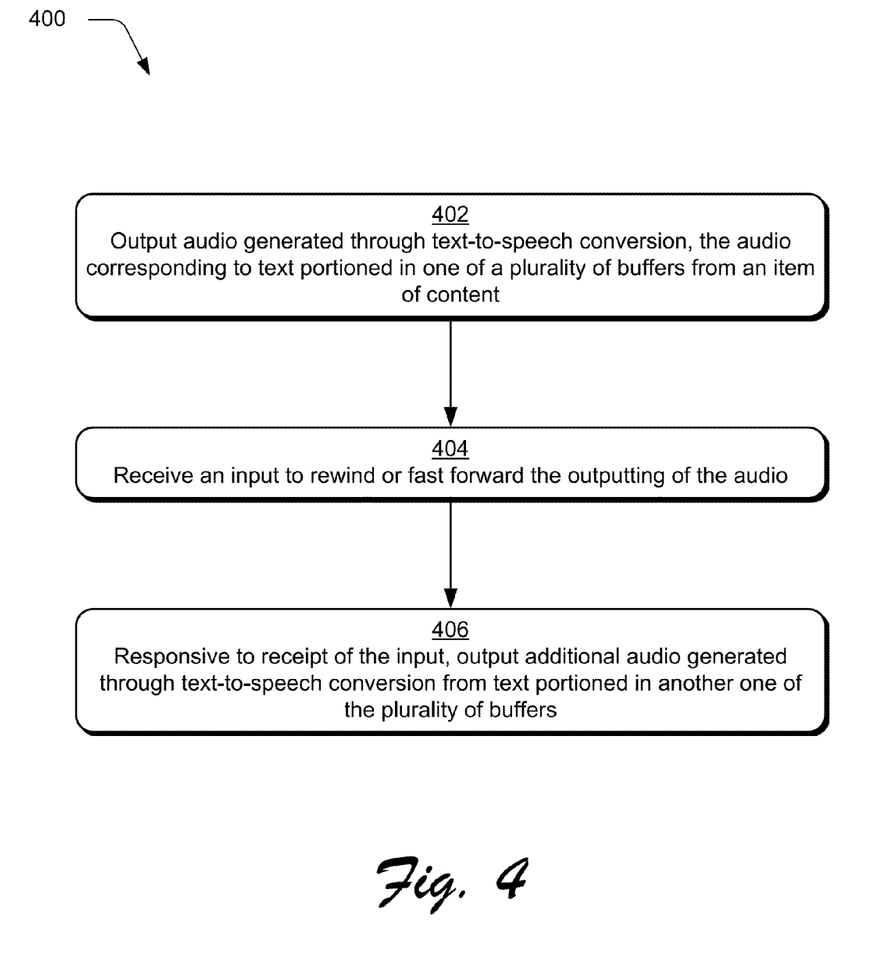
FIG. 4 is a flow diagram depicting a procedure in an example implementation in which navigation is performed through content portioned into buffers by the procedure of FIG. 3.

FIG. 4 depicts a procedure 400 in an example implementation in which navigation is performed through content portion into buffers by the procedure of FIG. 3. Audio is output that is generated through text-to-speech conversion, the audio corresponding to text portioned in one of a plurality of buffers from an item of content (block 402). The assistive module 114, for instance, may "read out" text from one of the buffers 202, 204, 206, descriptions of controls, and so on.

An input to rewind or fast forward the outputting of the audio (block 404). For example, a user may utilize a keyboard shortcut, speak a command, and so forth. In response to the command, the assistive module 114 may cease output of a current buffer and begin output of another puffer, such as another buffer ordered in succession for output.

Responsive to the receipt of the input, additional audio is output that was generated through text-to-speech conversion from text portioned in another one of the plurality of buffers (block 406). For a "rewind," for instance, the assistive module 114 may navigate to a buffer ordered sequentially before a current buffer. On the contrary, for a "fast forward," the assistive module 114 may navigate to a buffer ordered sequentially after a current buffer. Ordering of the buffers may be performed in a variety of ways by the assistive module 114, such as based on heuristics, layout, an order in which the content is received, and so on.

Figure 5:
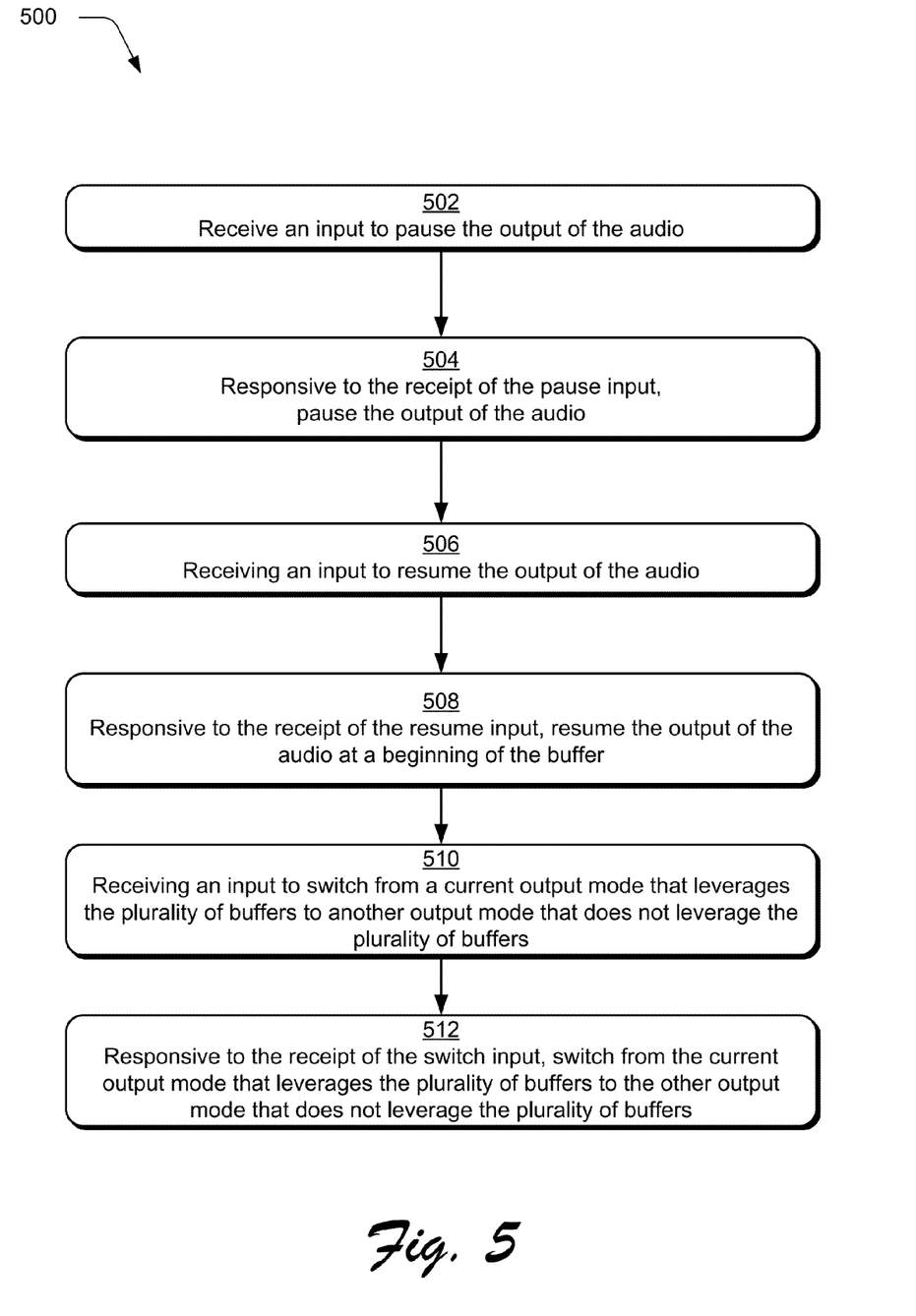
FIG. 5 is a flow diagram depicting a procedure in an example implementation in which inputs are utilized to control an output of the content as part of the navigation of FIG. 4.

FIG. 5 depicts a procedure 500 in an example implementation in which inputs are utilized to control an output of the content as part of the navigation of FIG. 4. An input is received to pause the outputting of the audio or the outputting of the additional audio (block 502). Responsive to the receipt of the pause input, the output of the audio is paused (block 504). The assistive module 114, for instance, may output content from buffer 204 and pause the output in response to a keyboard shortcut, spoken, command, and so on.

An input is received to resume output of the audio (block 506). Responsive to the receipt of the resume input, the output of the audio is resumed at a beginning of the respective buffer (block 508). The assistive module 114, for instance, may "return to a beginning" of the buffer 204 and repeat output of at least a portion of the content. In this way, a user may "regain their bearing" in the output of the content.

An input may also be received to switch from a current output mode that leverages the plurality of buffers to another output mode that does not leverage the plurality of buffers (block 510). Responsive to the receipt of the switch input, a switch is made from the current output mode that leverages the plurality of buffers to the other output mode that does not leverage the plurality of buffers (block 512). The assistive module 114, for instance, may change from the buffer navigation and portioning techniques described herein to a mode to navigate between controls, a mode to read an entirety of the content, and so on. A variety of other examples are also contemplated for assistive modes that do not involve use of the buffers.

Example System and Device

Figure 6:
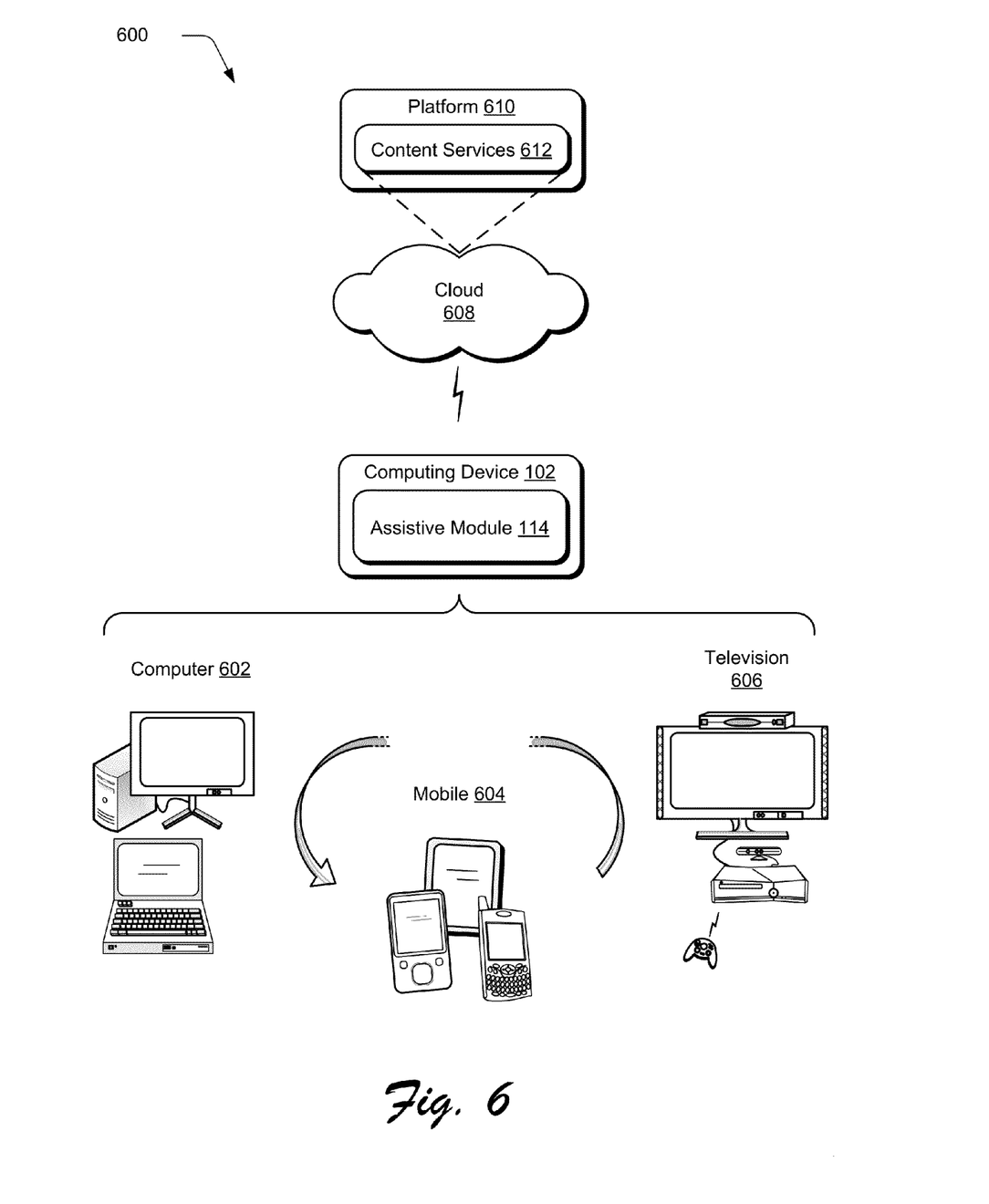
FIG. 6 illustrates an example system that includes the computing device as described with reference to FIG. 1.

FIG. 6 illustrates an example system 600 that includes the computing device 102 as described with reference to FIG. 1. The example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 602, mobile 604, and television 606 uses. Each of these configurations includes devices that may have generally different constructs and capabilities, and thus the computing device 102 may be configured according to one or more of the different device classes. For instance, the computing device 102 may be implemented as the computer 602 class of a device that includes a personal computer, desktop computer, a multi-screen computer, laptop computer, netbook, and so on.

The computing device 102 may also be implemented as the mobile 604 class of device that includes mobile devices, such as a mobile phone, portable music player, portable gaming device, a tablet computer, a multi-screen computer, and so on. The computing device 102 may also be implemented as the television 606 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein. This is illustrated through inclusion of the assistive module 114 on the computing device 102, which may also leverage the platform 610 "over the cloud" as described below.

The cloud 608 includes and/or is representative of a platform 610 for content services 612. The platform 610 abstracts underlying functionality of hardware (e.g., servers) and software resources of the cloud 608. The content services 612 may include applications and/or data that can be utilized while computer processing is executed on servers that are remote from the computing device 102. Content services 612 can be provided as a service over the Internet and/or through a subscriber network, such as a cellular or Wi-Fi network.

The platform 610 may abstract resources and functions to connect the computing device 102 with other computing devices. The platform 610 may also serve to abstract scaling of resources to provide a corresponding level of scale to encountered demand for the content services 612 that are implemented via the platform 610. Accordingly, in an interconnected device embodiment, implementation of functionality of the functionality described herein may be distributed throughout the system 600. For example, the functionality may be implemented in part on the computing device 102 as well as via the platform 610 that abstracts the functionality of the cloud 608.

Figure 7:
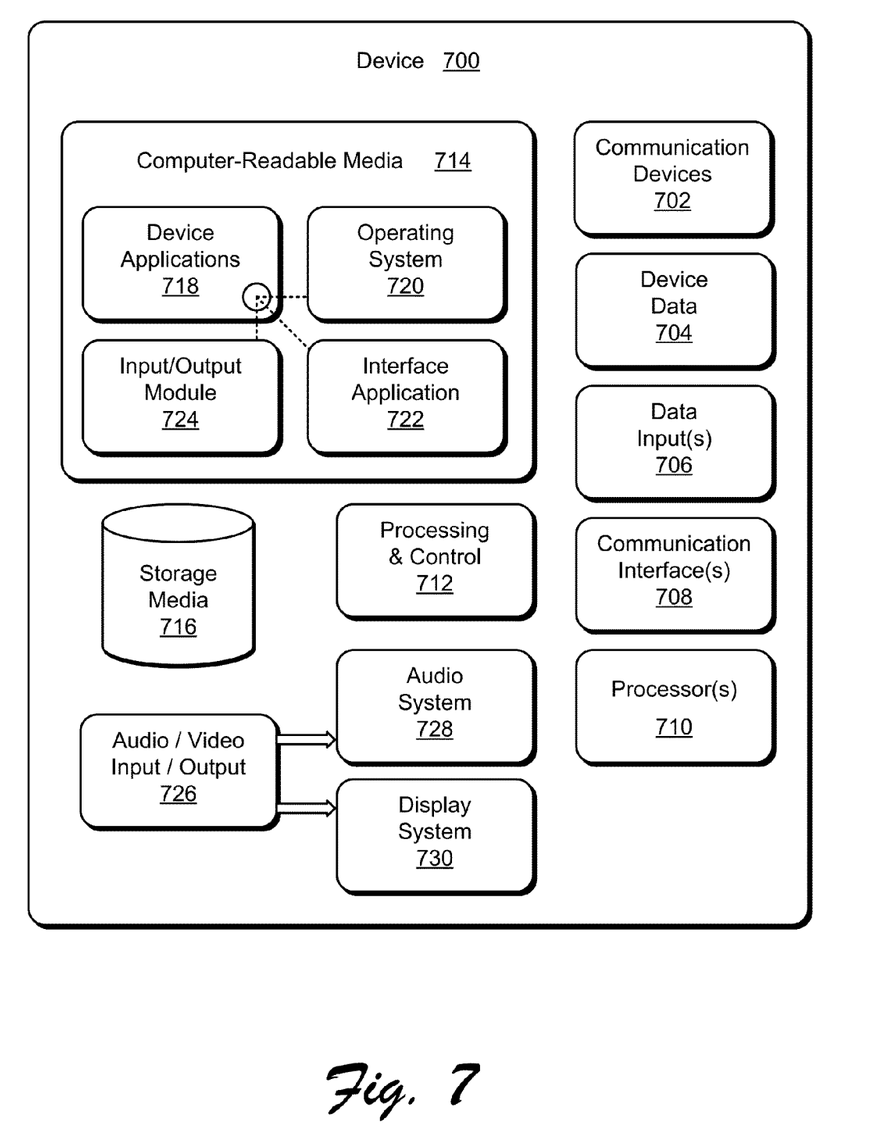
FIG. 7 illustrates various components of an example device that can be implemented as any type of computing device as described with reference to FIGS. 1, 2, and 6 to implement embodiments of the techniques described herein.

FIG. 7 illustrates various components of an example device 700 that can be implemented as any type of computing device as described with reference to FIGS. 1, 2, and 6 to implement embodiments of the techniques described herein. Device 700 includes communication devices 702 that enable wired and/or wireless communication of device data 704 (e.g., received data, data that is being received, data scheduled for broadcast, data packets of the data, etc.). The device data 704 or other device content can include configuration settings of the device, media content stored on the device, and/or information associated with a user of the device. Media content stored on device 700 can include any type of audio, video, and/or image data. Device 700 includes one or more data inputs 706 via which any type of data, media content, and/or inputs can be received, such as user-selectable inputs, messages, music, television media content, recorded video content, and any other type of audio, video, and/or image data received from any content and/or data source.

Device 700 also includes communication interfaces 708 that can be implemented as any one or more of a serial and/or parallel interface, a wireless interface, any type of network interface, a modem, and as any other type of communication interface. The communication interfaces 708 provide a connection and/or communication links between device 700 and a communication network by which other electronic, computing, and communication devices communicate data with device 700.

Device 700 includes one or more processors 710 (e.g., any of microprocessors, controllers, and the like) which process various computer-executable instructions to control the operation of device 700 and to implement embodiments of the techniques described herein. Alternatively or in addition, device 700 can be implemented with any one or combination of hardware, firmware, or fixed logic circuitry that is implemented in connection with processing and control circuits which are generally identified at 712. Although not shown, device 700 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 700 also includes computer-readable media 714, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 700 can also include a mass storage media device 716.

Computer-readable media 714 provides data storage mechanisms to store the device data 704, as well as various device applications 718 and any other types of information and/or data related to operational aspects of device 700. For example, an operating system 720 can be maintained as a computer application with the computer-readable media 714 and executed on processors 710. The device applications 718 can include a device manager (e.g., a control application, software application, signal processing and control module, code that is native to a particular device, a hardware abstraction layer for a particular device, etc.). The device applications 718 also include any system components or modules to implement embodiments of the techniques described herein. In this example, the device applications 718 include an interface application 722 and an input/output module 724 that are shown as software modules and/or computer applications. The input/output module 724 is representative of software that is used to provide an interface with a device configured to capture inputs, such as a touchscreen, track pad, camera, microphone, and so on. Alternatively or in addition, the interface application 722 and the input/output module 724 can be implemented as hardware, software, firmware, or any combination thereof. Additionally, the input/output module 724 may be configured to support multiple input devices, such as separate devices to capture visual and audio inputs, respectively.

Device 700 also includes an audio and/or video input-output system 726 that provides audio data to an audio system 728 and/or provides video data to a display system 730. The audio system 728 and/or the display system 730 can include any devices that process, display, and/or otherwise render audio, video, and image data. Video signals and audio signals can be communicated from device 700 to an audio device and/or to a display device via an RF (radio frequency) link, S-video link, composite video link, component video link, DVI (digital video interface), analog audio connection, or other similar communication link. In an embodiment, the audio system 728 and/or the display system 730 are implemented as external components to device 700. Alternatively, the audio system 728 and/or the display system 730 are implemented as integrated components of example device 700.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:
    receiving content that is to be displayed by the computing device in a specified arrangement, the content distinguished as text to be read and control elements to be initiated;
    portioning the text content into a plurality of buffers;
    portioning the controls content into one or more other plurality of buffers that are separate from the plurality of buffers that include the portions of the text content; and
    exposing the buffers having the portioned content for navigation through the content using one or more assistive techniques during display of the content in the specified arrangement, the assistive techniques supporting navigation between the buffers utilizing speech commands.

2. A method as described in claim 1, wherein the one or more assistive techniques include a screen reader that is configured to output audio from text included in the content.

3. A method as described in claim 1, wherein the portioning is performed such that controls included in the received content are assigned a single said buffer, respectively.

4. A method as described in claim 1, wherein the portioning is performed such that a predefined amount of text is defined for inclusion in individual said buffers.

5. A method as described in claim 4, wherein the amount is defined by a number of words or by formation of a single line in the content.

6. A method as described in claim 1, wherein the navigation includes a fast forward or rewind that is operable to skip output of at least a portion of the content by jumping from an output of content from a current said buffer to output of content from another said buffer.

7. A method as described in claim 1, wherein the portioning employs one or more heuristics to determine how to portion the content.

8. A method as described in claim 7, wherein the heuristics are operable to identify which of the content is text and which of the content defines a control.

9. A method as described in claim 1, wherein the content is a webpage.

10. A system comprising:
    one or more modules implemented at least partially in hardware, the one or more modules configured to perform operations comprising:
        distinguishing one or more portions of content, that are to be displayed by a computing device in a specified arrangement, as text or control elements to arrive at a logical combination of text and controls;
        portioning the text content into a plurality of buffers based on the combination of text and controls;
        portioning the controls content into one or more other plurality of buffers that are separate from the plurality of buffers that include the portions of the text content based on the combination of text and controls; and
        exposing the buffers having the portioned content for navigation through the content using one or more assistive techniques during display of the content in the specified arrangement, the assistive techniques supporting navigation within the buffers utilizing speech commands.

11. A system as described in claim 10, wherein the one or more assistive techniques include a screen reader that is configured to output audio from text included in the content.

12. A system as described in claim 10, wherein the portioning is performed such that controls included in the received content are assigned a single buffer, respectively.

13. A system as described in claim 10, wherein the portioning is performed such that a predefined amount of text is defined for inclusion in individual said buffers, the amount is defined by a number of words or by formation of a single line in the content.

14. A system as described in claim 10, wherein the navigation includes a fast forward or rewind that is operable to skip output of at least a portion of the content by jumping from an output of content from a current said buffer to output of content from another said buffer.

15. A system as described in claim 10, wherein the content is a webpage.

16. One or more computer readable storage media comprising instructions stored thereon that, responsive to execution by a computing devices, causes the computing device to perform one or more operations comprising:
    identifying one or more portions of content, that are to be displayed by a computing device in a specified arrangement, as text or control elements to arrive at a logical combination of text and controls;
    portioning the text content into a plurality of buffers based on the combination of text and controls;
    portioning the controls content into one or more other plurality of buffers that are separate from the plurality of buffers that include the portions of the text content based on the combination of text and controls; and
    exposing the buffers having the portioned content for navigation through the content using one or more assistive techniques during display of the content in the specified arrangement, the assistive techniques supporting navigation within the buffers and between the buffers utilizing speech commands.

17. One or more computer readable storage media as described in claim 16, wherein the one or more assistive techniques include a screen reader that is configured to output audio from text included in the content.

18. One or more computer readable storage media as described in claim 16, wherein the portioning is performed such that controls included in the received content are assigned a single buffer, respectively.

19. One or more computer readable storage media as described in claim 16, wherein the portioning is performed such that a predefined amount of text is defined for inclusion in individual said buffers, the amount is defined by a number of words or by formation of a single line in the content.

20. One or more computer readable storage media as described in claim 16, wherein the navigation includes a fast forward or rewind that is operable to skip output of at least a portion of the content by jumping from an output of content from a current said buffer to output of content from another said buffer.

* * * * *